United States Patent
Meerkerk et al.

(10) Patent No.: US 11,719,377 B2
(45) Date of Patent: Aug. 8, 2023

(54) HEADER DELIVERY SYSTEM

(71) Applicant: QUEST INTEGRITY GROUP, LLC, Sugar Land, TX (US)

(72) Inventors: Willem Meerkerk, Hardinxveld-Giessendam (NL); Nicolaas Dirk Bergshoeff, Sugar Land, TX (US); Maarten Cornelis Burggraaff, Tricht (NL)

(73) Assignee: Quest Integrity Group, LLC, Stafford, TX (US)

( * ) Notice: Subject to any disclaimer, the term of this patent is extended or adjusted under 35 U.S.C. 154(b) by 324 days.

(21) Appl. No.: 17/190,302

(22) Filed: Mar. 2, 2021

(65) Prior Publication Data
US 2021/0270404 A1    Sep. 2, 2021

Related U.S. Application Data

(60) Provisional application No. 62/983,835, filed on Mar. 2, 2020.

(51) Int. Cl.
| | |
|---|---|
| *F16L 55/46* | (2006.01) |
| *F28F 9/02* | (2006.01) |
| *F16L 1/09* | (2006.01) |
| *F16L 1/024* | (2006.01) |

(52) U.S. Cl.
CPC ............. *F16L 55/46* (2013.01); *F16L 1/0246* (2013.01); *F16L 1/09* (2013.01); *F28F 9/0246* (2013.01)

(58) Field of Classification Search
CPC .. F16L 55/46; F16L 1/0246; F16L 1/09; F28F 9/0246
USPC ...................................................... 137/15.09
See application file for complete search history.

(56) References Cited

U.S. PATENT DOCUMENTS

| | | |
|---|---|---|
| 8,733,187 B2 | 5/2014 | Loftstrom |
| 2012/0291939 A1 | 11/2012 | Warren et al. |
| 2013/0276558 A1 | 10/2013 | Lofstrom |
| 2021/0172268 A1* | 6/2021 | Westgarth ................. F16L 1/09 |

FOREIGN PATENT DOCUMENTS

| | | |
|---|---|---|
| EP | 3543585 A1 | 9/2019 |
| JP | S61165597 A | 7/1986 |
| KR | 10-2017-0099203 A | 8/2017 |
| WO | 2013030353 A1 | 3/2013 |

OTHER PUBLICATIONS

International Search Report and Written Opinion in application PCT/US2020/018837 dated Apr. 29, 2020.

* cited by examiner

*Primary Examiner* — Mahmoud Gimie
(74) *Attorney, Agent, or Firm* — Patterson + Sheridan, LLP (57) ABSTRACT

A header delivery system and method for performing a pigging operation on a process tube connected to a header pipe. The header delivery system is insertable in the header pipe and has a launcher pipe for launching an inspection or cleaning tool to the process tube. A tube coupler for coupling to the process tube and a bumper are connected to the launcher pipe. A jack apparatus is configured to position the tube coupler and the bumper. A wedge assembly is connected to the launcher pipe and has a first actuating wedge and a first extension wedge. A first linear actuator is connected to the first actuating wedge and is configured to move the first extension wedge and the tube coupler mount apart from one another to position the tube coupler and the bumper from a retracted position to an extended position.

20 Claims, 9 Drawing Sheets

FIG. 14

HEADER DELIVERY SYSTEM

PRIOR RELATED APPLICATION

This application claims priority to U.S. Provisional Application No. 62/983,835, filed Mar. 2, 2020, which is incorporated by reference in its entirety for all purposes.

FIELD OF INVENTION

In general, the disclosure describes a system and methodology for a header delivery system for a header pipe for performing an operation on process tubes connected to a header pipe.

BACKGROUND OF INVENTION

Pigging of pipes or pipelines is performed to remove internal fouling, to inspect for defects in a pipe or to map the geographic location of the pipe. Pigging is done by pumping a device, i.e. a pig, through a pipe. Intelligent pigs have sensors that can record information on the condition of the pipe.

One example use of pigs is in cleaning fired heaters that are used in industries such as power and oil and gas. Fired heaters are typically insulated enclosures that use heat created by the combustion of fuels to heat fluids contained within coils, tubes, pipes, or the like. The type of fired heater is generally described by the structural configuration, the radiant tube coil configuration and the burner arrangement.

Over time, the internal coils/tubes/pipes of the fired heater are subject to pollution and wear during their work cycle. The internal coils/tubes/pipes may become internally fouled with coke. Coke is ash made of carbon fragments that lays down and coats the interior of the coils/tubes/pipes. Coke deposits drop out of the process stream if/when the stream gets too hot and starts to thermally degrade. Decoking is the industry term used to describe the process of removing coke or other types of internal fouling from a fired heater's inner pipes/tubes/coils. Presently, decoking is done by conveying cleaning pigs through the pipes/tubes/coils.

When cleaning or inspecting furnaces, the furnaces may contain one or more manifolds, also referred to as header pipes. A header pipe has process tubes connected to the header pipe at one or more angular positions around the header pipe. To enable the pigging company to perform an operation to clean or inspect the furnace, there needs to be a temporary header delivery system (HDS) installed in the header pipes to access one or more process tubes. In many cases, header delivery systems may not be configured for varying sizes of header pipes that have a wide range of internal diameters, including header pipes with small internal diameters. Header pipes below a certain internal diameter size may not have been inspected or cleaned because the header delivery systems may not have been available for such limited-sized header pipes.

What is needed, is a system and methodology to enable the performance of pigging and other operations on process tubes connected to a header pipe of a range of sizes, including header pipes with small internal diameters.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

An embodiment of the disclosure provides a header delivery system for a header pipe having a process tube extending from the header pipe. The header delivery system includes a launcher pipe having a first pipe end forming a first pipe opening and a second pipe end forming a second pipe opening, a frame assembly connected to the launcher pipe, a tube coupler connected to the launcher pipe at the second pipe end, and a bumper connected to the launcher pipe, and a jack apparatus. The jack apparatus includes a tube coupler mount connected to the launcher pipe at the second pipe end and connected to the tube coupler, a wedge assembly connected to the launcher pipe and having a first actuating wedge and a first extension wedge disposed adjacent one another in a wedge configuration, and a linear actuator assembly. The linear actuator assembly has a first linear actuator connected to the first actuating wedge and configured to move the first actuation wedge in a first linear direction and to move the first extension wedge and the tube coupler mount apart from one another in response to the movement of the first actuation wedge in the first linear direction. The tube coupler and the bumper move from a retracted position to an extended position as the first extension wedge and the tube coupler mount move apart from one another.

Another embodiment of the present disclosure provides a method of accessing a process tube extending from a header pipe using a header delivery system of the present disclosure. The method includes inserting the header delivery system in the header pipe with the tube coupler and the bumper in a retracted position; aligning the header delivery system in the first header pipe with the process tube in an alignment position and with the tube coupler in a retracted position; after aligning the header delivery system, actuating the first linear actuator to move the first actuation wedge in the first linear direction to position the tube coupler and the bumper from the retracted position to an extended position to form a seal between the tube coupler and the process tube; and performing a first service operation on the process tube with the tube coupler and the bumper in the extended position using the launcher pipe to access the process tube.

Another embodiment of the present disclosure provides a header delivery system for a header pipe having a process tube extending from the header pipe. The header delivery system includes a launcher pipe, a tube coupler connected to the launcher pipe at the second pipe end, a bumper connected to the launcher pipe, and a jack apparatus. The jack apparatus includes a tube coupler mount connected to the launcher pipe at the second pipe end and connected to the tube coupler, a wedge assembly connected to the launcher pipe and having a first actuating wedge and a first extension wedge disposed adjacent one another in a first wedge configuration and a second actuating wedge and a second extension wedge disposed adjacent one another in a second wedge configuration, a linear actuator assembly having a first linear actuator connected to the first actuating wedge and a second linear actuator connected to the second actuating wedge, and the linear actuator assembly configured to move the first actuation wedge and the second actuator wedge in a first linear direction and to move the first extension wedge and the second extension wedge apart from the tube coupler mount in response to the movement of the first actuation wedge and the second actuation wedge in the first linear direction. The tube coupler and the bumper move from a retracted position to an extended position as the first extension wedge and the tube coupler mount move apart from one another.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. As used herein, the terms "coils", "pipes", and "tubes" are used individually or in combination to mean the internal fluid carrying elements of a fired heater.

The present disclosure generally relates to a system and method addressing the need for a header delivery system that is sized to be inserted into a header pipe or manifold that may have a small diameter. The header delivery system of the present disclosure is designed with system components that allow the header delivery system to be sized to be fit in headers pipes of limited size. In embodiments of the present disclosure, linear actuators are mounted in alignment with a launcher pipe and connected to a wedge assembly disposed on opposite sides of the launcher pipe and that is configured to be contained between a tube coupler mount and a bottom of the launcher pipe when in a retracted position. The wedge assembly converts the linear motion of the linear actuators to radial motion that moves the tube coupler and a bumper from a retracted position to an extended position. The header delivery system of the present disclosure provides a header delivery system that is efficiently designed for limited-sized header pipes.

Figure 1:
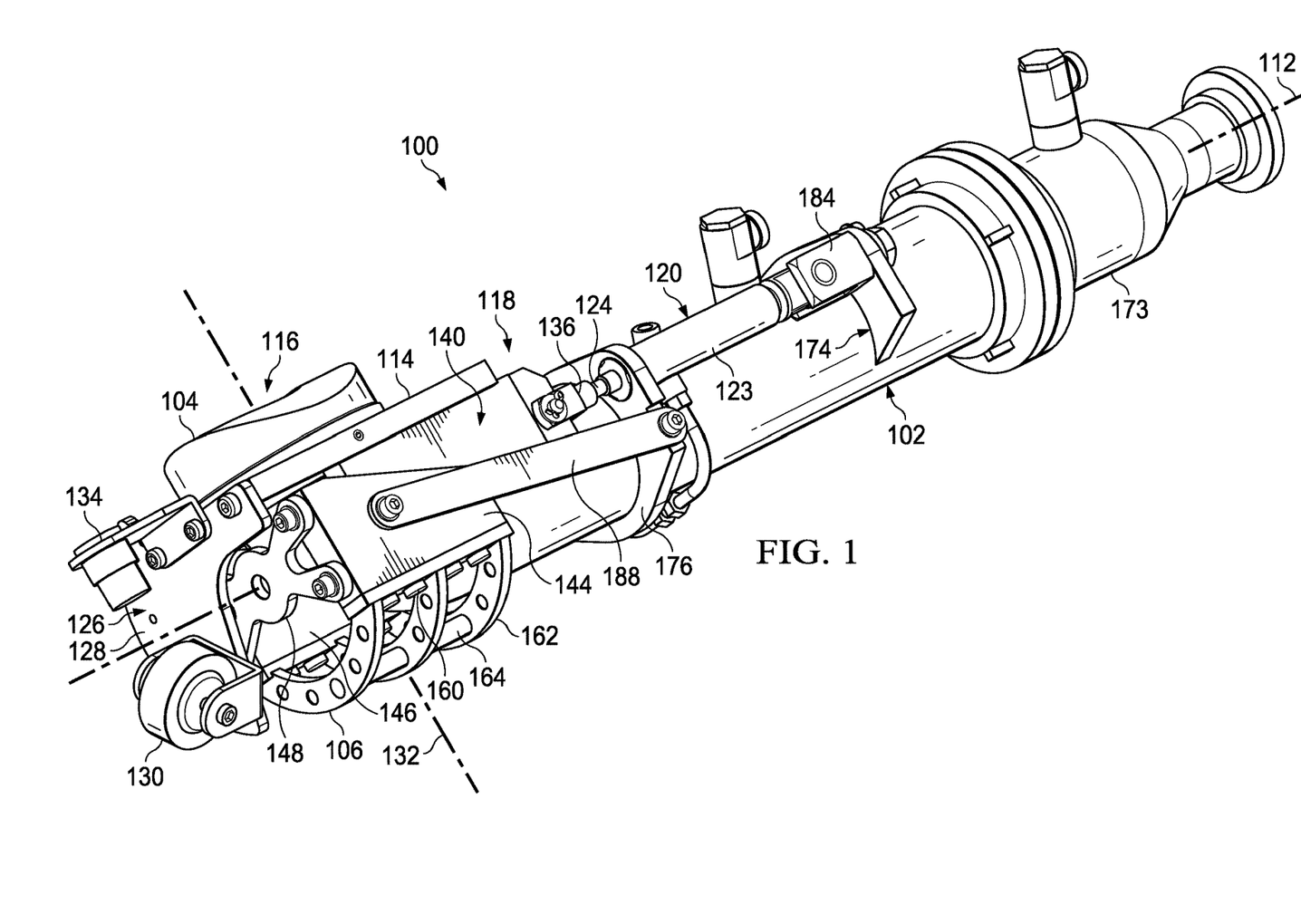
FIG. 1 is a bottom perspective view of a header delivery system according to embodiments of the present disclosure.
Figure 2:
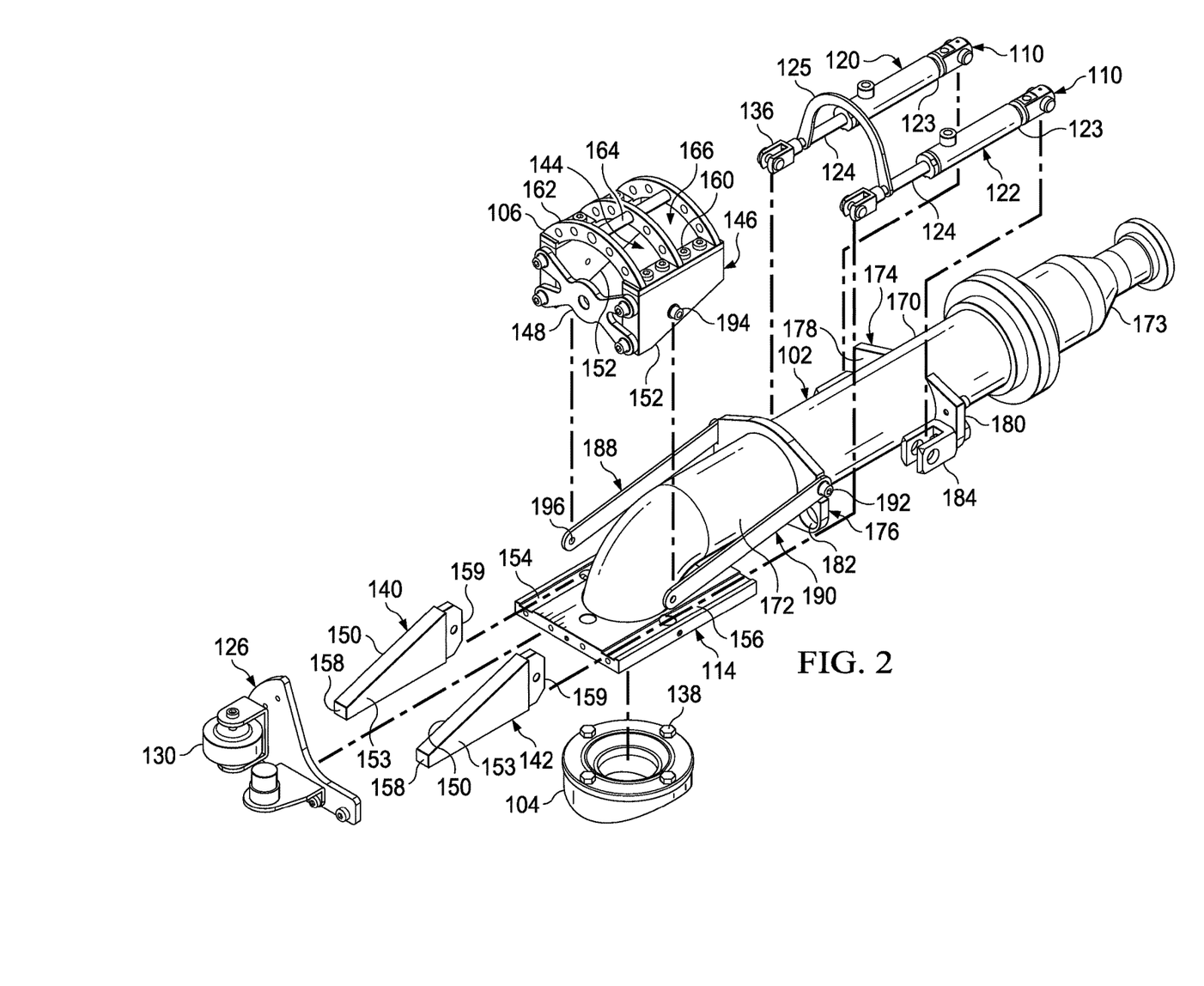
FIG. 2 is an exploded view of the header delivery system according to embodiments of the present disclosure.

Referring to FIG. 1, a header delivery system 100 is shown. Header delivery system 100 includes a launcher pipe 102 coupled to a tube coupler 104 and a bumper 106 disposed opposite one another and a jack apparatus. The jack apparatus is formed by a tube coupler mount 114, a wedge assembly 118, and a linear actuator apparatus 110 formed by a first linear actuator 120 and a second linear actuator 122, as shown in FIG. 1 and FIG. 2. Tube coupler 104 and the bumper 106 may be disposed on opposite sides of a first axis 112 extending through the launcher pipe 102. The first axis 112 may be a center line that extends through a section of the launcher pipe 102. First linear actuator 120 is shown in FIG. 1 and the second linear actuator 122 is shown in FIG. 2. Linear actuators 120, 122 each include a cylinder 123 and a piston 124. The linear actuator apparatus 110 and the wedge assembly 118 of the jack assembly are configured to move tube coupler 104 and the bumper 106 between a retracted position and an extended position to adjustably position the radial spacing between one another, as discussed in more detail below.

A wheel apparatus 126 is formed by a wheel plate 128 connected to the tube coupler mount 114 and a wheel 130 connected to the wheel plate 128. Wheel 130 is axially spaced from the launcher pipe 102 at one end of the launcher pipe 102. Positioning the wheel 130 on the wheel plate 128 provides the benefit of helping to limit the outer diameter of the header delivery system 100 between the tube coupler 104 and the bumper 106 to enable the header delivery system 100 to be inserted in header pipe of a limited or small diameter. For example, the wheel 130 may be connected to the wheel plate 128 so that the wheel 130 is contained within a top surface of the tube coupler 104 and bumper 106 when in a fully retracted position, as shown in FIG. 1. Wheel apparatus 126 may be used in inserting and positioning the header delivery system 100 in a header pipe. Header delivery system 100 may be positioned in a header pipe by positioning the wheel 130 against an internal surface of the header pipe and pushing or pulling the header delivery system 100 with the wheel rolling on the internal surface of the header pipe. In some embodiments, an accessory mount 126 may be connected to the tube coupler mount 114 and an accessory, such as a camera, not shown, may be mounted on the accessory mount 134. A mounted camera may be used in positioning the header delivery system 100 in a header pipe.

In some embodiments, the tube coupler 104 may have a curved outer surface configured to conform to a curved surface of the inner diameter of a header pipe. In some embodiments, the tube coupler 104 may have a curved outer surface of a different radius or a flat outer surface configured to conform to the internal surface of the header pipe. In some embodiments, the tube coupler 104 may be made of a resilient material configured to form a seal. Tube coupler 104 forms a tube coupler opening 116 that extends through the tube coupler 104 and adjacent an opening in the launcher pipe 102.

The linear actuator apparatus 110 and the wedge assembly 118 of the jack apparatus are configured to radially position the tube coupler 104 and the bumper 106 with respect to one another. For example, the linear actuator apparatus 110 and the wedge assembly 118 are configured to position the tube coupler 104 and the bumper 106 radially apart from one another as the tube coupler 104 and the bumper 106 are positioned from a retracted position to an extended position. Linear actuator apparatus 110 and the wedge assembly 118 are configured to position the tube coupler 104 and the bumper 106 radially toward one another as the tube coupler 104 and the bumper 106 are positioned from an extended position to a retracted position. Tube coupler 104 and the bumper 106 may move in radial directions along a second axis 132 as the tube coupler 104 and the bumper 106 are positioned between an extended position and a retracted position. Second axis 132 may be perpendicular to the first axis 112. Second axis 132 may form a centerline of the tube coupler 104, as shown in FIG. 1. In some embodiments, the tube coupler 104 and the bumper 106 move radially with respect to the first axis 112 when the header delivery system 100 moves between a retracted position and an extended position.

Referring to FIG. 1 and FIG. 2, wedge assembly 118 includes a first actuating wedge 140, a second actuating wedge 142, a first extension wedge 144 and a second extension wedge 146. FIG. 1 shows a perspective view of one side of the header delivery system 100 and shows a first portion of the wedge assembly 118 and a first portion of the linear actuator apparatus 110. The opposite side of the header delivery system 100 includes a similar second portion of the wedge assembly 100 and a similar second portion of the linear actuator apparatus 110, as shown in FIG. 2.

Figure 7:
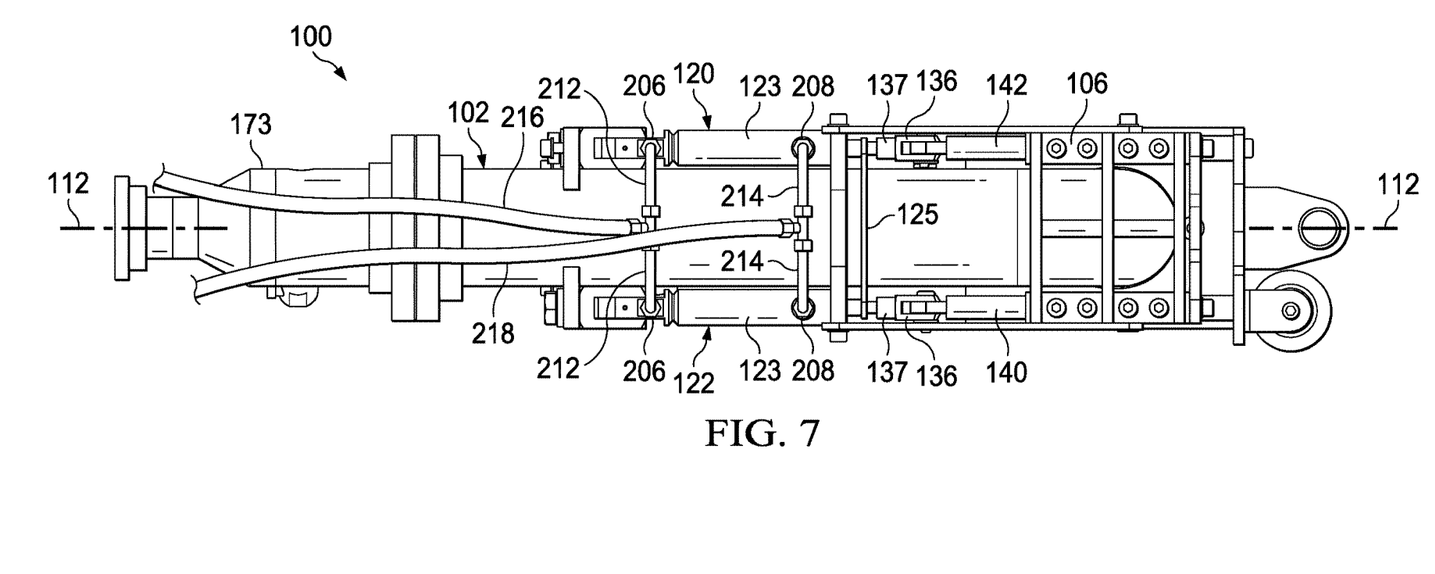
FIG. 7 is a bottom view of the header delivery system according to embodiments of the present disclosure.

Actuating wedges 140, 142 are each connected to a piston 124 of one of the linear actuators 120, 122. Each of the pistons 124 may have a wedge connector 136 configured to connect an end of the piston 124 to an end of one of the actuating wedges 140, 142. Each of the pistons 124 may have a piston coupler 137 connected to one of the wedge connectors, as shown in FIG. 7. FIG. 1 shows the first actuating wedge 140 connected at one end to the piston 124 of the first linear actuator 120. Referring to FIG. 2, the second actuating wedge 142 may be connected at one end to the piston 124 of the second linear actuator 122. A support member 125 may be connected to each of the pistons 124. Support member 125 is disposed between the piston connectors 136 and the cylinders 123 of the linear actuators 120, 122. Support member 125 may be rigid and have a U-shape, as shown in FIG. 2, or a curved shape that is configured to accommodate the outer diameter of the launcher pipe 102. Support member 125 connects to the pistons to synchronize the extension and retraction of the pistons 124 of the spaced-apart cylinders 123. Actuating wedges 140, 142 are connected to linear actuators 120, 122 to position the tube coupler 104 and the bumper 106 between the retracted position and the extended position.

Actuating wedges 140, 142 each have a first tapered face 150 and an opposite first base face. Tube coupler mount 114 may include a first wedge channel 154 and a second wedge channel 156. A base face of each of the actuating wedges 140, 142 may be configured to slidably move within the wedge channels 154, 156 as the actuating wedges 140, 142 are extended and retracted by the pistons 124 to move the tube coupler 104 and the bumper 106 between a retracted position and an extended position. Extension wedges 144, 146 each have a second tapered face 152 and an opposite second base face. First tapered faces 150 of the actuating wedges 140, 142 have the same taper angle as the second tapered faces 152 of the extension wedges 144, 146. First tapered faces 150 each are adjacent and slide against one of the second tapered faces 152, as shown in FIG. 1, as the actuating wedges 140, 142 are moved to position the tube coupler 104 and the bumper 106 between a retracted position and an extended position. First actuating wedge 140 and the first extension wedge 144 with the tapered faces 150 disposed adjacent one another may be referred to as being in a wedge configuration.

Actuating wedges 140, 142 each include an actuating wedge tapered end 158 and an actuating wedge non-tapered end 159. Actuating wedge non-tapered end 159 may also be referred to as a tall end. As shown in FIG. 1, the actuating wedge tapered end 158 of the first actuating wedge 140 is disposed between the tube coupler mount 114 and the first extension wedge 146.

First extension wedge 144 and the second extension wedge 146 together may form a bumper mount for bumper 106. Extension wedges 144, 146 are spaced apart from one another and an end plate 148, as shown in FIG. 1, may be connected at one end of each of the extension wedges 144, 146 to connect the extension wedges 144, 146 in a spaced-apart configuration. A bumper 106 may be connected to the extension wedges 144, 146 and the bumper 106 extends outward from the base face on each of the extension wedges 144, 146.

Mechanical fasteners, such as bolts 160 may connect the bumper 106 to the extension wedges 144, 146. Bolts 160 may be disconnected from the wedges 144, 146 to allow for different sized bumpers 106 to be connected to the extension wedges 144, 146. Different sized bumpers 106 may be connected to the extension wedges 144, 146 to accommodate header pipes having varied internal diameters. Bumper 106 may have a convex shape that is configured to conform to an internal wall of a header pipe. Bumper 106 may have other shapes that conform to an internal wall of header pipes of different shapes. FIG. 1 and FIG. 2 show a bumper 106 having three convex members 162 and a support bar 164 extending through an opening in each of the convex members 162 to provide support to the bumper 106. Extension wedges 144, 146 are disposed on opposite sides of the launcher pipe 102 and form an extension wedge cavity 166 configured to accommodate the launcher pipe 102.

Referring to FIG. 2, launcher pipe 102 may include a first pipe section 170 and a second pipe section 172. First pipe section 170 is connected to the second pipe section 172 in an end-to-end configuration. Second pipe section 172 forms a 90-degree elbow section of the launcher pipe 102 with one end connected to the first pipe section 170 and an opposite end connected to the tube coupler mount 104. Pipe sections 170, 172 may be welded together or otherwise securely joined together. Tube coupler mount 114 may be welded to an end of the second pipe section 172. Mechanical fasteners 138 may be used to connect the tube coupler 104 to the tube coupler mount 114. Reducer pipe 173 may be used as a coupler to the launcher pipe 102 with the reduced pipe 173 having a reduced diameter at one end so that a fluid hose may be connected. The fluid hose may be connected to a pump to provide hydraulic power to pump a cleaning or inspection tool, such as a pig, through a launcher pipe and a process tube connected to the launcher pipe 102. In some embodiments, the reducer pipe 173 may be removed from an end of the first section pipe 170 and an inspection or cleaning tool may be inserted in the end of the first pipe section 170. Reducer pipe 173 may be reconnected to the end of the first pipe section 170 after the inspection or cleaning tool has been inserted.

A frame assembly is formed by a first frame apparatus 174 and a second frame apparatus 176 axially spaced from one another and connected to the launcher pipe 102. Frame apparatuses 174, 176 may be welded to the launcher pipe 102. First frame apparatus 174 may include a first bracket member 178 and a second bracket member 180 each connected on an opposite side of the first pipe section 170. A cylinder connector 184 may be connected to each of the bracket members 178, 180. Second frame apparatus 176 is spaced between the first frame apparatus 174 and the second pipe section 172. Second frame apparatus 176 may extend around the launcher pipe 102 and forms an external bracket extending outwardly form an outer surface of the launcher pipe 102. Second frame apparatus 176 has frame openings 182 disposed on opposite sides of the launcher pipe 102.

A first linkage member 188 and a second linkage member 190 each have a pivot connection to the second frame apparatus 176. A first pivot connector 192 may be used to pivotally connect one end of each of the linkage members 188, 190 to the second frame apparatus 176. First pivot connectors 192 may be formed by a mechanical fastener such as a bolt that extends through a first pivot opening in each of the linkage members 188, 190 and is connected to the second frame apparatus 176. Linkage members 188, 190 each have a pivot connection at a second end to one of the extension wedges 144, 146. A second pivot connector 194 may be used to pivotally connect an opposite end of each of the linkage members 188, 190 to one of the extension wedges 144, 146. Second pivot connectors 194 each may be formed by a mechanical fastener such as a bolt that extends through a second pivot opening 196 in each of the linkage members 188, 190 and is connected to one of the extension wedges 144, 146.

Figure 8:
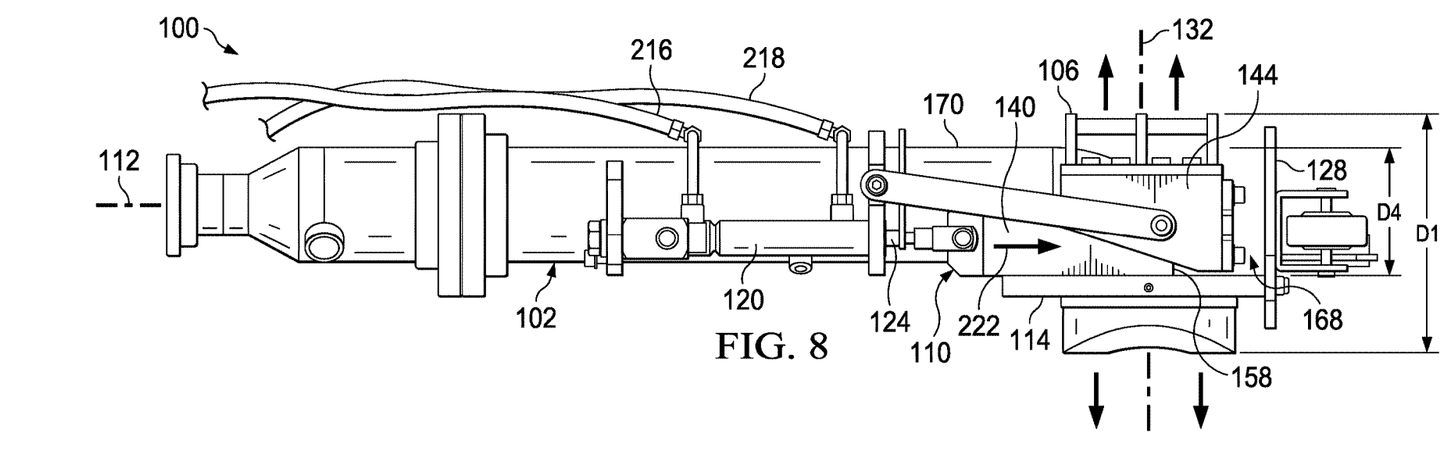
FIG. 8 is a side view of the header delivery system in a retracted position according to embodiments of the present disclosure.
Figure 9:
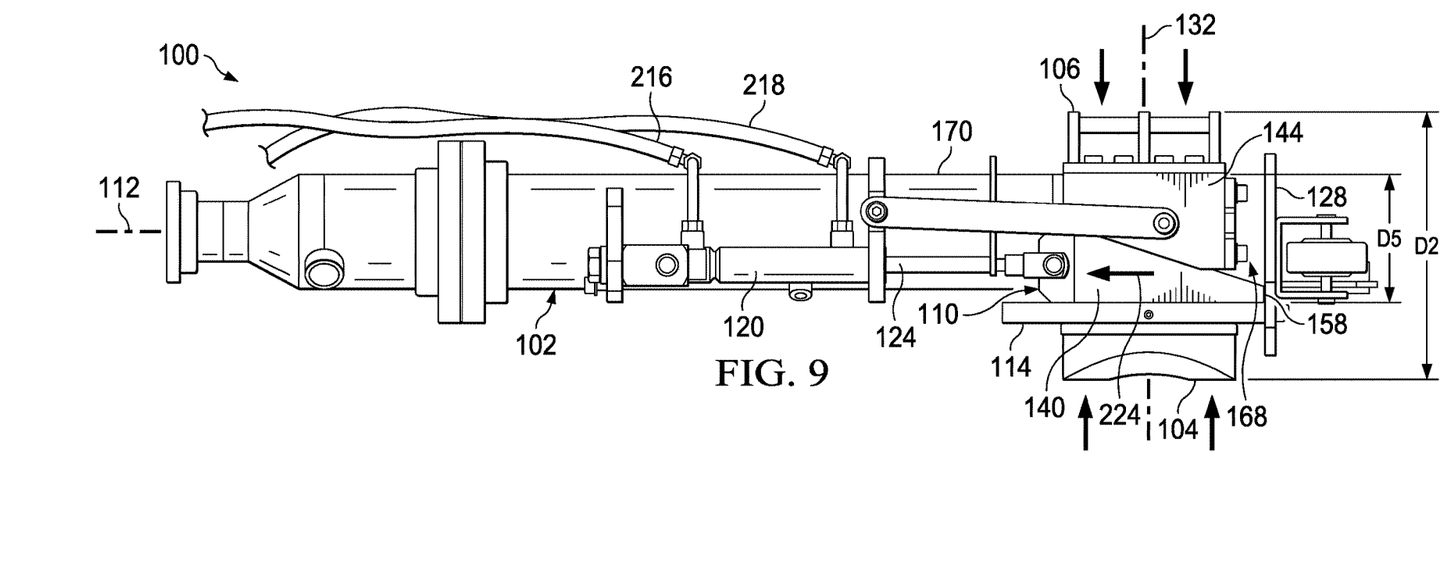
FIG. 9 is a side view of the header delivery system in an extended position according to embodiments of the present disclosure.

First linkage member 188 has a first pivot connection to the first extension wedge 144 and a second pivot connection to the first frame apparatus 174 and is configured to pivot at the first pivot connection and the second pivot connection to move the tube coupler mount 114 and the first extension wedge 144 apart as the tube coupler 104 and the bumper 106 are positioned from a retracted position, as shown in FIG. 8, to an extended position, as shown in FIG. 9. Referring to FIG. 1 and FIG. 2, second linkage member 190 has a third pivot connection to the second extension wedge 146 and a fourth pivot connection to the first frame apparatus 174 and is configured to pivot at the third pivot connection and the fourth pivot connection to move the tube coupler mount 114 and the second extension wedge 146 apart as the tube coupler 104 and the bumper 106 are positioned from the retracted position to the extended position.

First linear actuator 120 is connected to the first actuating wedge 140 and is configured to move the first actuation wedge 140 in a first linear direction parallel to the first axis 112 and to move the first extension wedge 144 and the tube coupler mount 114 apart from one another in response to the movement of the first actuating wedge 140 in the first linear direction. Tube coupler 104 and the bumper 106 move from a retracted position to an extended position as the first extension wedge 144 and the tube coupler mount 114 move apart from one another.

First linear actuator 120 is configured to move the first actuation wedge 140 in a second linear direction parallel to the first axis 112 and to move the first extension wedge 144 and the tube coupler mount 114 towards one another in response to the movement of the first actuation wedge 140 in the second linear direction. Tube coupler 104 and the bumper 106 move from the extended position to the retracted position as the first extension wedge 140 and the tube coupler mount 114 move toward one another.

Second linear actuator 120 is connected to the second actuating wedge 142 and is configured to move the second actuation wedge 142 in the first linear direction parallel to the first axis 112 and to move the second extension wedge 146 and the tube coupler mount 114 apart from one another in response to the movement of the second actuating wedge 142 in the first linear direction. Tube coupler 104 and the bumper 106 move from a retracted position to an extended position as the second extension wedge 146 and the tube coupler mount 114 move apart from one another.

First linear actuator 120 is configured to move the second actuation wedge 142 in the second linear direction parallel to the first axis 112 and to move the second extension wedge 146 and the tube coupler mount 114 towards one another in response to the movement of the second actuation wedge 142 in the second linear direction. Tube coupler 104 and the bumper 106 move from the extended position to the retracted position as the second extension wedge 146 and the tube coupler mount 114 move toward one another.

Linear actuators 120, 122 may be actuated together to move the actuating wedges 140, 142 together in either the first linear direction or the second linear direction. Actuating wedges 140, 142 move together in response to movement of the linear actuators 120,122 to position the tube coupler 104 and the bumper 106 between the retracted position and the extended position.

Figure 3:
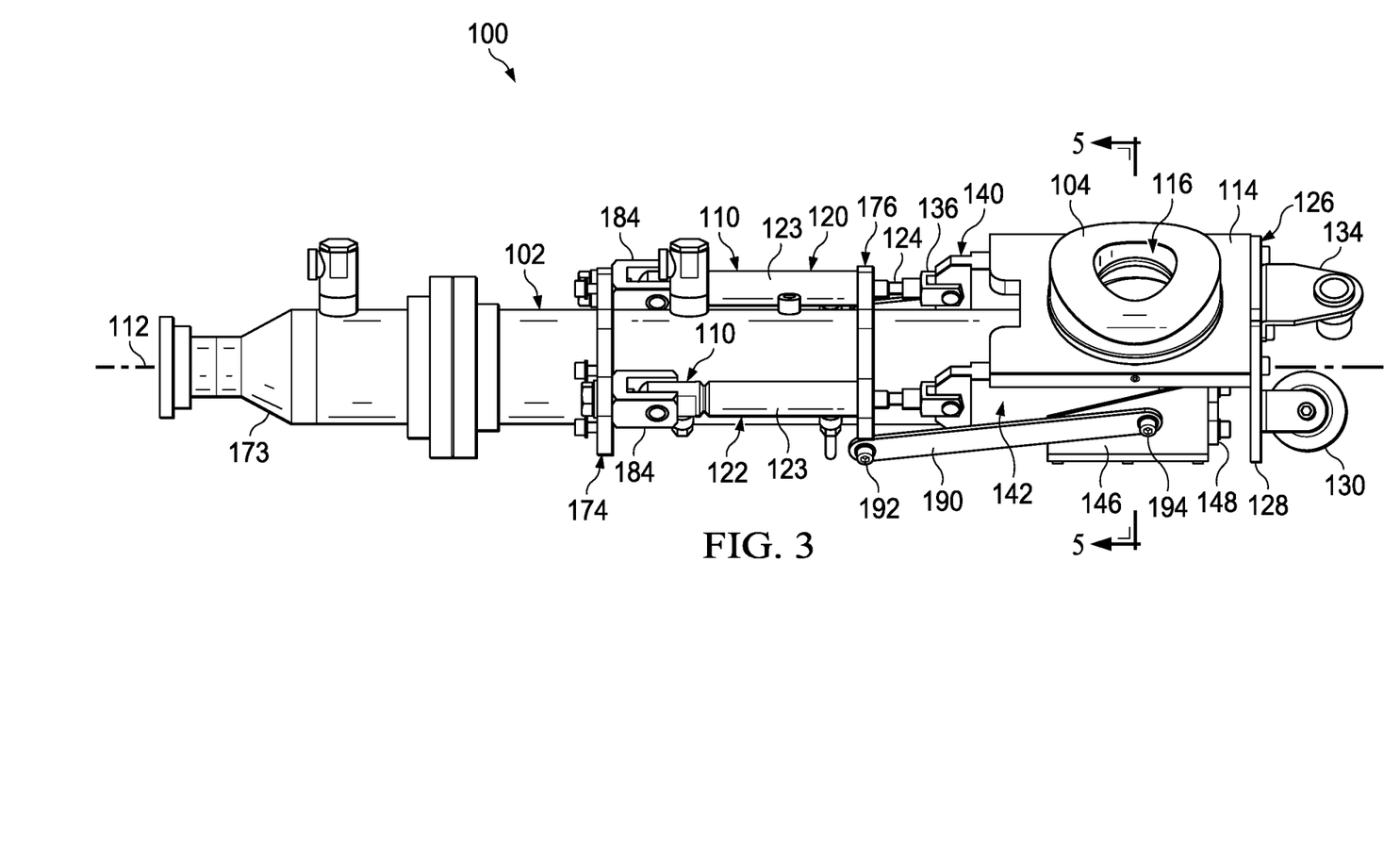
FIG. 3 is a top perspective view of a header delivery system according to embodiments of the present disclosure.

Referring to FIG. 3, frame apparatuses 174, 176 are used in connecting the linear actuators 120, 122 and the linkage members 188, 190 to the launcher pipe 102. Spaced-apart cylinders 123 are each connected to the first frame apparatus 174 at one end by one of the cylinder connectors 184. A second end of each of the cylinders 123 is positioned adjacent to the second frame apparatus 176. Each of the pistons 124 extend through the frame openings 182 in the second frame apparatus 176. Cylinders 123 are mounted to the frame apparatuses 174, 176 in an axial direction parallel to the first axis 112 to position the linear actuators 120, 122 in an axial position with respect to the launcher pipe 102 and the first axis 112. Cylinders 123 may be parallel with one another. Cylinders 123 may be parallel to the first axis 112. Linkage members 188, 190 each are pivotally connected at one end to the second frame apparatus 176 and pivotally connected at an opposite end to one of the extension wedges 144, 146. Each actuating wedge 142 is disposed between the tube coupler mount 114 and one of the extension wedges 144, 146. FIG. 3 shows the second actuating wedge 142 disposed between the tube coupler mount 114 and the second extension wedge 146. Wheel plate 128 and wheel 130 are axially spaced from the end plate 148 and the launcher pipe 102.

Figure 4:
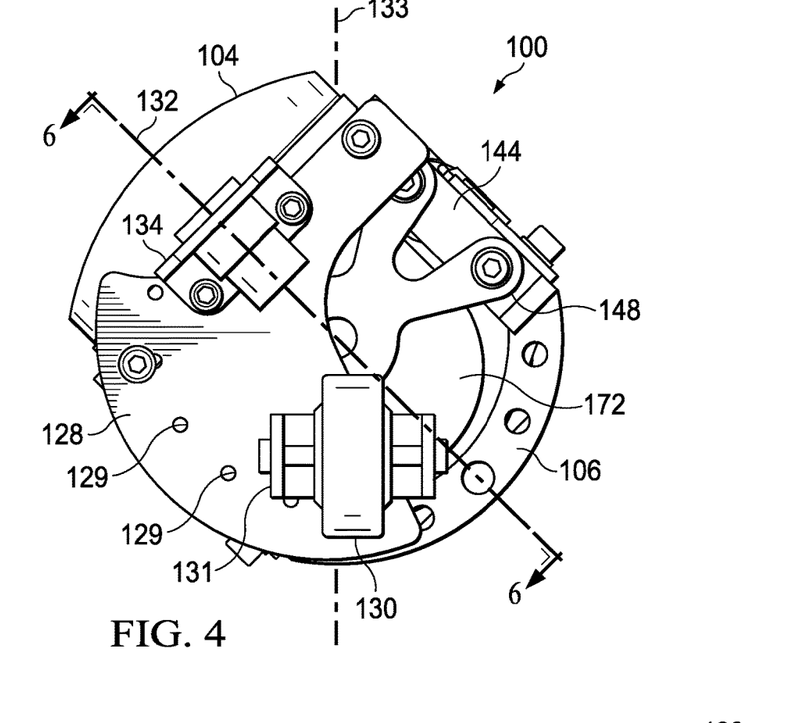
FIG. 4 is a back view of the header delivery system according to embodiments of the present disclosure.

Referring to FIG. 4, an end view of the header delivery system 100 is shown. Header delivery system 100 may be at an angular position of forty-five degrees with respect to a vertical axis 133. Bumper 106 is connected to the first extension wedge 144. Second pipe section 172 is shown disposed behind the end plate 148 and the wheel plate 128. Wheel plate 128 is connected to the tube coupler 104, as shown in FIG. 4. Wheel 130 extends outwardly from the wheel plate 128 and is disposed within an outer periphery of the header delivery system 100 so that the wheel 130 does not increase the diameter of the header delivery system 100. In some embodiments, the wheel 130 is disposed within the outer periphery of the header delivery system 100 when the header delivery system 100 is in a fully retracted position, as shown in FIG. 4. In some embodiments, the wheel 130 is disposed within the outer periphery of the header delivery system 100 when the header delivery system 100 is in a fully extended position.

A plurality of wheel connection openings 129 may be formed adjacent a periphery of the wheel plate 128 and are configured to allow the wheel to be position in a plurality of different positions, such as different circumferential positions, on the wheel plate 128. Wheel 130 may have a wheel bracket 131 configured to attach the wheel 130 in different positions on the wheel plate 128. Mechanical fasteners, not shown, such as bolts may be used to connect the wheel bracket 131 to the wheel plate 128.

Figure 5:
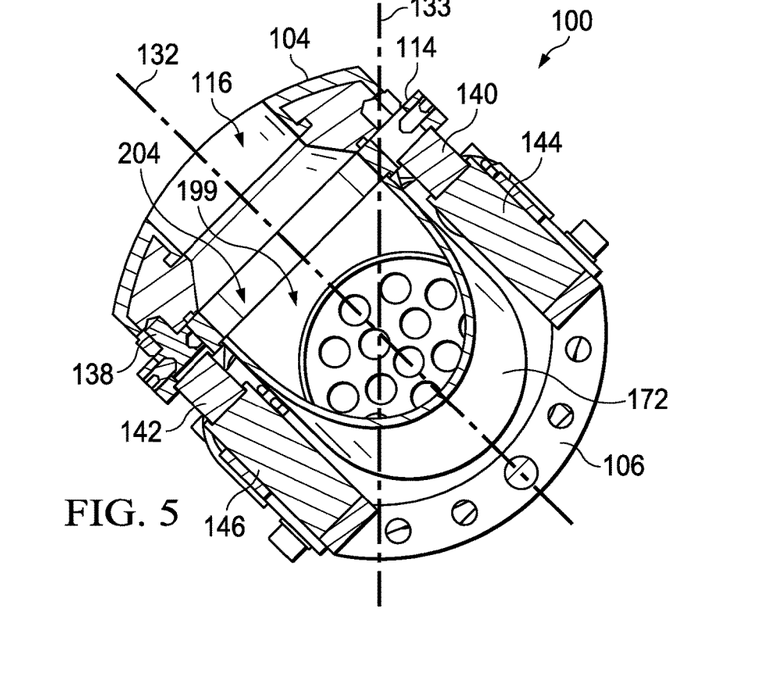
FIG. 5 is a cross-sectional view of the header delivery system take taken along lines 5-5 of FIG. 3.

Referring to FIG. 5, a cross-section of the header delivery system 100 of FIG. 3 along plane 5-5 is shown. Tube coupler 104 is connected to the tube coupler mount 114 with mechanical fasteners 138. Tube coupler mount 114 forms a mount opening 204 leading from the tube coupler opening 116 to a second launcher pipe opening 199 and the internal diameter of the second pipe section 172 of the launcher pipe 102. Bumper 106 is connected to the base face of each of the extension wedges 144, 146. Actuation wedges 140, 142 are each shown positioned adjacent and abutting one of the extension wedges 144, 146 at mating tapering faces in a wedge configuration.

Figure 6:
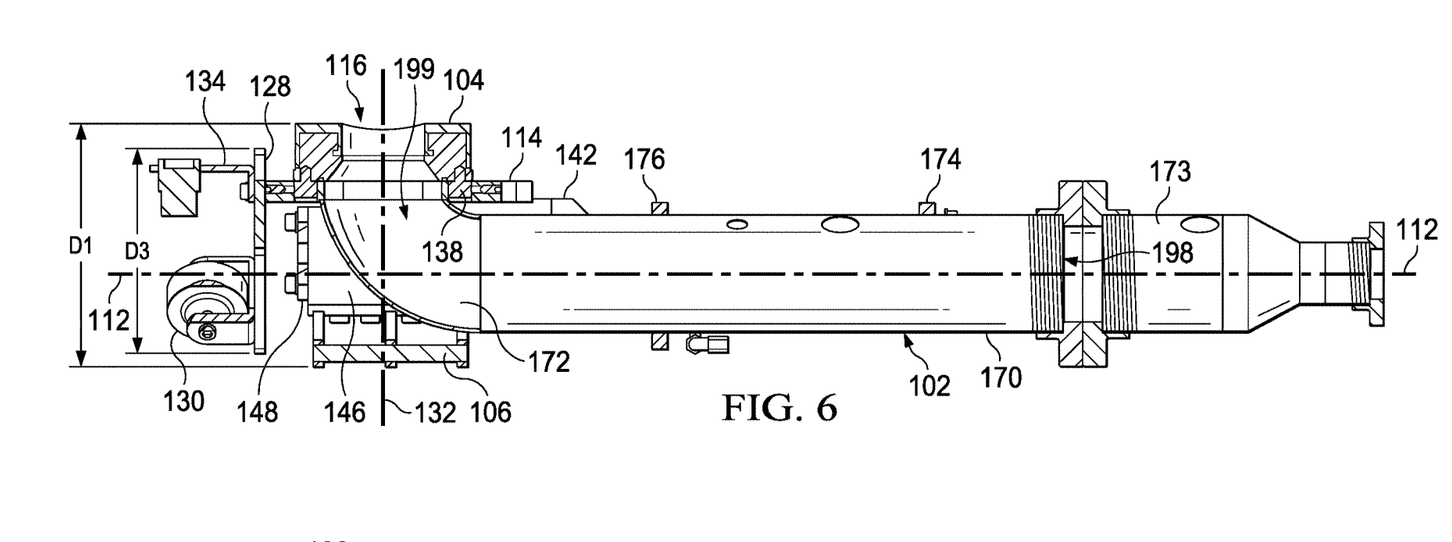
FIG. 6 is a cross-sectional view of the header delivery system take taken along lines 6-6 of FIG. 4.

Referring to FIG. 6, a cross-section of the header delivery system 100 of FIG. 4 is shown. Launcher pipe 102 has a first launcher pipe opening 198 formed at a first end of launcher pipe 102 and a second launcher pipe opening 199 formed at an opposite end of the launcher pipe 102. Header delivery system 100 is shown in a fully retracted position. In the fully retracted position, the header delivery system 100 has a height D1 from an outer surface of the tube coupler 104 and an outer surface of the bumper 106. Wheel plate 128 has a height D3 from one end to the opposite end. Wheel 130 is contained within the height D1 between the outer surface of the tube coupler 104 and the outer surface of the bumper 106. Wheel 130 may also be contained with the height D3 of the wheel plate 128 in some embodiments. The positioning of the wheel plate 128 and the wheel 130 to have a height D3 not exceeding height D1 helps provide a limited height for the header delivery system 100 to allow the header delivery system 100 to be inserted and used in header pipes of limited or small diameters. Height D1 and Height D3 may be measured along axis that are parallel to the vertical axis 132.

Referring to FIG. 7, a bottom view of the header delivery system 100 is shown. Linear actuators 120, 122 each may include a cylinder 123 that is a dual-acting cylinder, as shown in FIG. 7. In some embodiments, cylinder 123 may be a single-acting cylinder. Cylinders 123 each may include a first port 206 and a second port 208 leading to the internal diameter of the cylinder 123. A first actuator tubing 212 is connected to the first ports 206 and a second actuator tubing 214 is connected to the second ports 208 on the cylinders 123. A first actuator hose 216 is connected to the first actuator tubing 212 and a second actuator hose 218 is connected to the second actuator tubing 214. Actuator hoses 216, 218 may extend from the actuator tubing 212, 214 along the launcher pipe 202 and extend outside of a header pipe and may be connected to a hydraulic pump for actuating the linear actuators 120, 122.

Fluid may be pumped through the first actuator hose 216 to each of the first ports 206 to apply a hydraulic force to each of the cylinders 123 to perform a piston extension actuation. A piston extension actuation forces each of the pistons 124 to extend in a first axial direction, as shown in arrow 222 in FIG. 8, thereby applying an extension force to each of the actuating wedges 140, 142. Fluid may be pumped through the second actuator hose 218 to each of the second ports 206 to apply a hydraulic force to each of the cylinders 123 to perform a piston retraction actuation. A piston retraction actuation forces each of the pistons 124 to retract in a second axial direction, as shown in arrow 224 in FIG. 9, thereby applying a retraction force to each of the actuating wedges 140, 142. The first axial direction 222 may bt opposite to the second axial direction 224, and the first and second axial directions 222, 224 may be parallel to the first axis 112.

FIG. 8 and FIG. 9 show a side view of the header delivery system 100 to show operation of one side of the jack apparatus. Each side of the jack apparatus includes one of the linear actuators 120, 122, the actuating wedges 142, 144, and the extension wedges 144, 146. The opposing sides of the jack apparatus operate in a similar manner. The spaced-apart distance between a bumper outer surface of the bumper 106 and a tube coupler outer surface of the tube coupler 104 when in a retracted position shown in FIG. 8 is a distance D1. The spaced-apart distance between a bumper outer surface of the bumper 106 and a tube coupler outer surface of the tube coupler 104 when in an extended position shown in FIG. 9 is a distance D2. D2 is greater than D1. Distance D1 and D2 may be referred to as a radial distance with respect to the first axis 112.

Header delivery system 100 is shown in a retracted position in FIG. 8, where the linear actuator 120 is being actuated in the first axial direction 222 towards the extended position in FIG. 9. Conversely, the extended position shown in FIG. 9 shows the linear actuator 120 being actuated in the second axial direction 224 back to the retracted position as shown in FIG. 8. In more detail, FIG. 8 shows the actuating wedge tapered end 158 of the first actuating wedge 140 disposed between the tube coupler mount 114 and the first extension wedge 144 and axially spaced adjacent to the launcher pipe 102 when the header delivery system 100 is in the retracted position. FIG. 9 shows the actuating wedge tapered end 158 of the first actuating wedge 140 axially spaced from the launcher pipe 102 with the actuating wedge tapered end 158 extending outwardly from a portion of the first actuating wedge 140 disposed between both the tube coupler mount 114 and the first extension wedge 144. Actuating wedge tapered end 158 may be disposed in an end space 168 located between the wheel plate 128 and the first extension wedge 144. In some embodiments, the end space 168 provides the benefit of providing additional space for the linear actuators to be mounted on the launcher pipe 102. End space 168 may be an axial space extending axially with respect to the first axis 112.

To position the header delivery system 100 from a retracted position to an extended position, as the arrows in FIG. 8 indicated, a piston extension actuation may be performed. The piston extension actuation moves the pistons 124 in the first axial direction to move the actuating wedges 140, 142 in the first axial direction. Actuating wedges 142, 144 each are slid in the first axial direction between the tube coupler mount 114 and one of the extension wedges 144, 146, as depicted by arrow 222.

When moving between the retracted position and the extended position as the arrows in FIG. 9 indicated, the actuating wedges 140, 142 move in the first axial direction, as depicted by arrow 222. There is a wedging action between the actuating wedges 140, 142 and the extension wedges 144, 146 as the actuating wedges 140, 142 move in the first axial direction and the actuating wedges 140, 142 force the extension wedges 144, 146 and the tube coupler mount 114 apart from one another. Bumper 106 connected to the extension wedges 144, 146 and the tube coupler 104 connected to the tube coupler mount 114 are forced apart from one another to position the tube coupler 104 and the bumper 106 in the extended position shown in FIG. 9.

When moving between the extended position and the retracted position, the actuating wedges 140, 142 move in the second axial direction, as depicted by arrow 224. There is a wedging action between the actuating wedges 140, 142 and the extension wedges 144, 146 as the actuating wedges 140, 142 move in the second axial direction and the actuating wedges 140, 142 the force from the actuating wedges is removed to allow the extension wedges 144, 146 and the tube coupler mount 114 to move toward one another. Bumper 106 connected to the extension wedges 144, 146 and the tube coupler 104 connected to the tube coupler mount 114 may move toward one another to position the tube coupler 104 and the bumper 106 in the retracted position shown in FIG. 8.

FIG. 8 shows that in some embodiments the wedge assembly formed by the actuating wedges 140, 142 and the extension wedges 144, 146 when in the retracted position are contained between the outer diameter of the first pipe section 170 of the pipe launcher 102 and the tube coupler mount 114 and the second launcher pipe opening 199, as depicted by D4. FIG. 9 shows that in some embodiments the wedge assembly formed by the actuating wedges 140, 142 and the extension wedges 144, 146 when in the extended position are contained between the outer diameter of the first pipe section 170 of the pipe launcher 102 and the tube coupler mount 114 and the second launcher pipe opening 199, as depicted by D5. D5 is larger than D4. In some embodiments, the linear actuators 120, 122 are contained between the outer diameter of the first pipe section 170 of the pipe launcher 102 and the tube coupler mount 114 when the header delivery system 100 in in the retracted position, as depicted by D4. The efficient mounting of the linear actuators 120, 122 and the wedge assembly to contain system components between the tube coupler mount 114 and the pipe launcher 102 provides the benefit of reducing the diameter or system height of the header delivery system 100 as measured by the distance D1 in the retracted position and D2 in the extended position.

Figure 10:
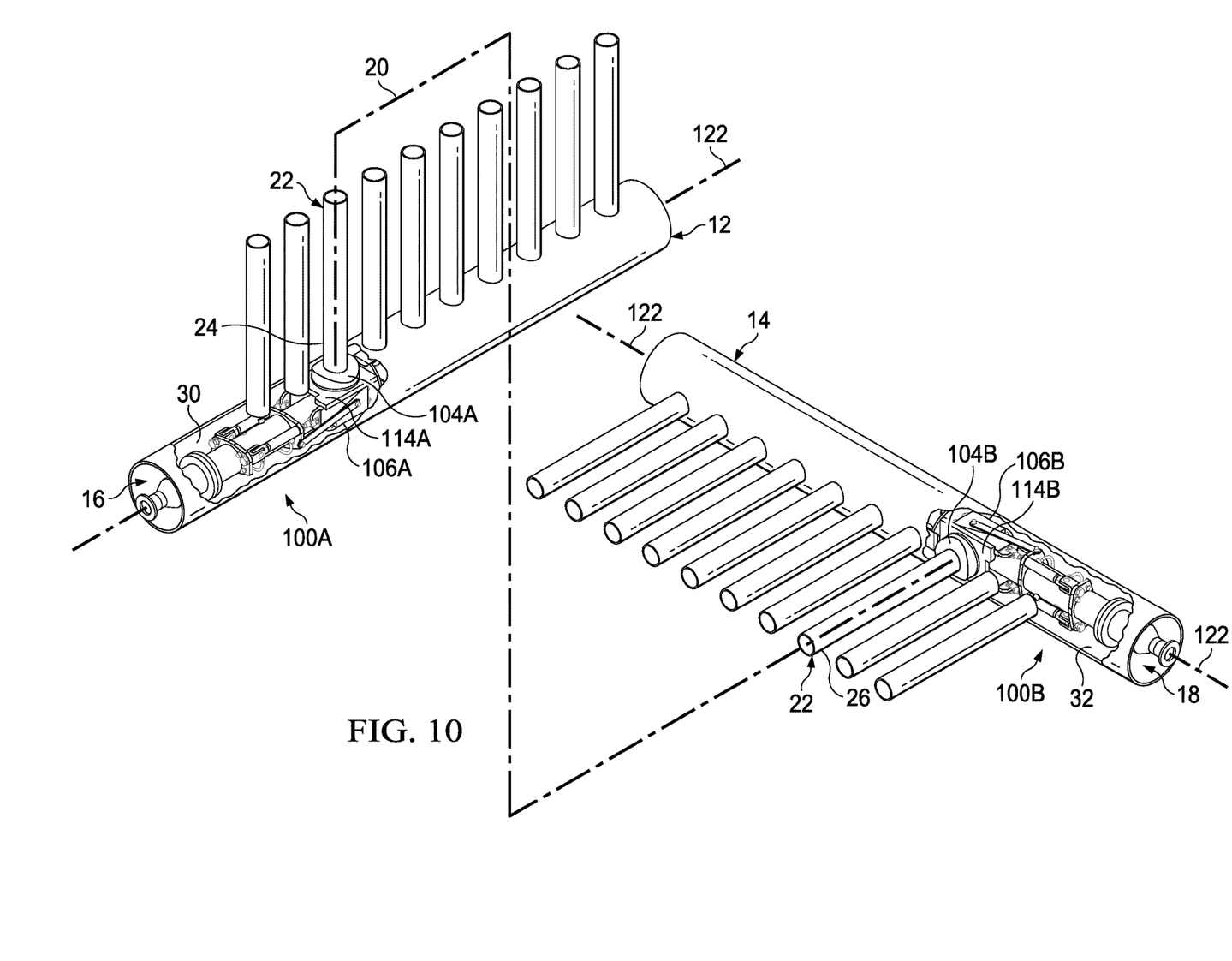
FIG. 10 is a perspective view of a first header delivery system in an installation position in a first header pipe and a second header delivery system in the installation position in a second header pipe according to embodiments of the present disclosure.

Referring to FIG. 10, a first header delivery system 100A is shown in an inlet header pipe 12 and a second header delivery system 100B is shown in an outlet header pipe 14. Inlet header pipe 12 has a cut-away section in a first side wall 30 and the outlet header pipe 14 has a cut-away section in a second side wall 32 to illustrate the header delivery systems 100A, 100B. The header delivery systems 100A, 100B may be positioned when the header delivery systems 100A, 100B are in a retracted position to align the header delivery systems 100A, 100B with the process tube 22 to be sealed. A retracted position is selected for the header delivery systems 100A, 100B so that the height of the header delivery systems 100A, 100B is less than the internal diameter of the respective header pipes 12, 14 to allow the header delivery systems 100A, 100B to be axially moved into an alignment position with the process tube 22 to be sealed.

Inlet header pipe 12 has a first header pipe opening 16 and the outlet header pipe 14 has a second header pipe opening 18. A process tube 22 extends between the inlet header pipe 12 and the outlet header pipe 14 as shown by line 20. As shown in FIG. 10, a plurality of process tubes may extend between the inlet header pipe 12 and the outlet header pipe 14. Ten process tubes are shown in FIG. 10.

Figure 11:
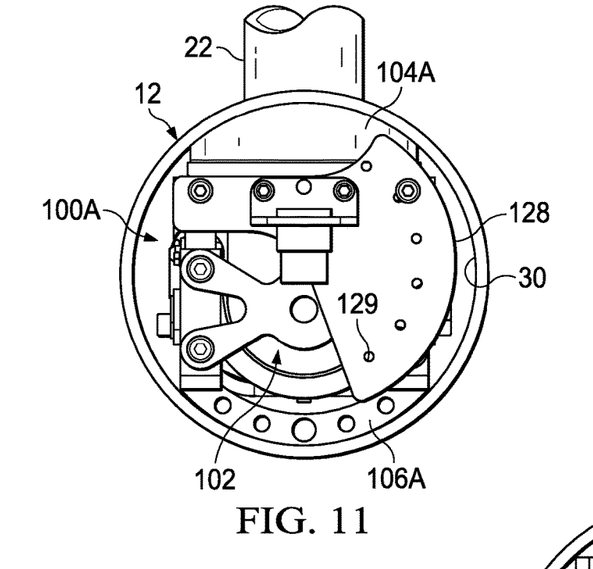
FIG. 11 is a back view of the header delivery system in a first angular position and in the installation position in a header pipe according to embodiments of the present disclosure.
Figure 12:
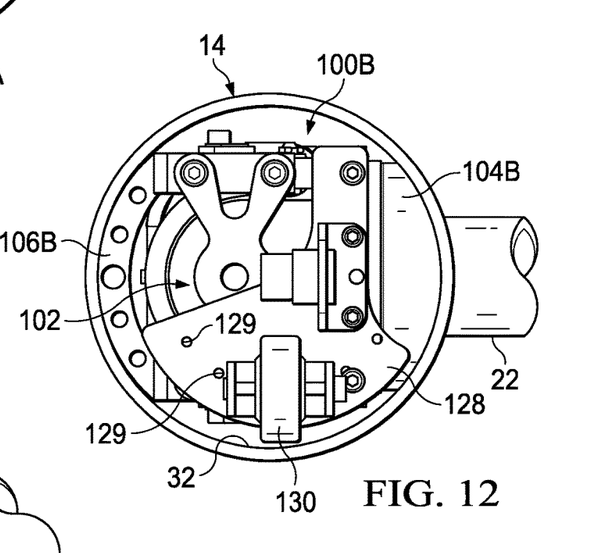
FIG. 12 is a back view of the header delivery system in a second angular position and in the installation position in the header pipe according to embodiments of the present disclosure.

Process tube 22 has a first tube end 24 that connects to the inlet header pipe 12 at a fluid opening in the first side wall 30. Process tube 22 has a second tube end 26 that connects to the second outlet header pipe 14 at a fluid opening in the second side wall 32. First tube end 24 is connected to the inlet header pipe 12 at a first angular position with respect to a first axis 122A as shown in FIG. 10 and FIG. 11, and the second tube end 24 is connected to the outlet header pipe 14 at a second angular position with respect to a second axis 122B as shown in FIG. 10 and FIG. 12. Header pipes 12, 14 may have a cylindrical shape.

First header delivery system 100A is in an extended position and is at a first angular position. In this first angular position, the first tube coupler 104A and the first bumper 106A have a first angular position that corresponds to the first tube angular position of the first tube end 24 of the first process tube 22, as shown in FIG. 10 and FIG. 11. In this extended position, the first header delivery system 100A is aligned with the first process tube 22. First tube coupler 104A and the first bumper 106A are each pressed against opposite sides of the internal diameter of the side wall 30 to form a seal between the first tube coupler 104A and the process tube 22. In more detail, the tube coupler 104A is positioned against the internal diameter of the first side wall 30 to form a seal around the fluid opening in the first side wall 30, and the bumper 106A is positioned opposite the first tube coupler 104A against the internal diameter of the first side wall 30. First coupler tube 104A and the first bumper 106A press against the internal diameter of the first header pipe 12 to secure the first header delivery system 100A in an installed position in the first header pipe 12 where the tube coupler 104A is sealed to the process tube 22.

Second header delivery system 100B is in an extended position and is at a second angular position. In this second angular position, the second tube coupler 104B and the second bumper 106B have a second angular position that corresponds to the second tube angular position of the first tube end 24 of the first process tube 22, as shown in FIG. 10 and FIG. 12. In this extended position, the second header delivery system 100B is aligned with the first process tube 22. Second tube coupler 104B and second bumper 106B are each pressed against opposite sides of the internal diameter of the second side wall 32 to form a seal between the second tube coupler 104B and the process tube 22. In more detail, the second tube coupler 100B is positioned against the internal diameter of the second side wall 32 to form a seal around the fluid opening in the second side wall 32, and the second bumper 106B is positioned opposite the second tube coupler 104B against the internal diameter of the second side wall 32. Second coupler tube 120B and second bumper 106B press against the internal diameter of the second header pipe 14 to secure the second header delivery system 100B in an installed position in the second header pipe 14 where the second tube coupler 104B is sealed to the process tube 22.

Referring to FIG. 11, a back view of the first header delivery system 100A of FIG. 10 is shown. Wheel plate 128 is connected to the first tube coupler mount 114A, shown in FIG. 10. A wheel 130 is not connected to the wheel plate 128. In some embodiments, the header delivery system 100A, without a wheel 130, may be inserted in the first header pipe 12 by sliding the header delivery system 100A in the header pipe 12 on either the first bumper 106A or the first tube coupler 104A.

Referring to FIG. 12, a back view of the second header delivery system 100B of FIG. 10 is shown. Wheel plate 128 is connected to the second tube coupler mount 114B, shown in FIG. 10. Wheel 130 is connected to the wheel plate 128 in a first position. Header delivery system 100A may be inserted in the first header pipe 12 by rolling the wheel 130 of the header delivery system 100A on the internal wall 32 of the header pipe 14.

Figure 13:
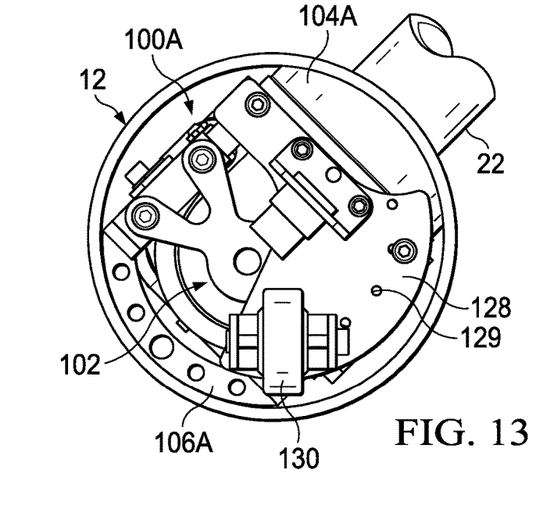
FIG. 13 is a back view of the header delivery system in a third angular position and in the installation position in the header pipe according to embodiments of the present disclosure.

Referring to FIG. 13, a back view of the first header delivery system 100A of FIG. 10 in a third angular position is shown. The third angular position may be one hundred and thirty-five degrees. Wheel plate 128 is connected to the second tube coupler mount 114A, shown in FIG. 10. Wheel 130 is connected to the wheel plate 128 in a second position. Header delivery system 100A may be inserted in the first header pipe 12 by rolling the wheel 130 of the header delivery system 100A on the internal wall 32 of the header pipe 14.

In operation, a method of accessing a process tube extending from a header pipe may be performed using a header delivery system of the present disclosure. Referring to the flow chart of FIG. 14, the header delivery system is inserted in the header pipe with the tube coupler in a retracted position. [block 1402]. The header delivery system is aligned in the header pipe with the process tube in an alignment position and with the tube coupler and the bumper in a retracted position [block 1404]. A user may determine a tube angular position of a process tube in a first header pipe. The user may determine tube angular position of the process tube using information, such as equipment plans. In addition, the user may visually or use cameras to determine the tube angular position. After aligning the header delivery system, the first linear actuator is actuated to move the first actuation wedge in the first linear direction to position the tube coupler and the bumper from the retracted position to an extended position to form a seal between the tube coupler and the process tube [block 1406]. A first service operation is performed on the process tube with the tube coupler and the bumper in the extended position using the launcher pipe to access the process tube [block 1408]. The first service operation may be a cleaning or an inspection of the process tube using a pig.

Figure 14:
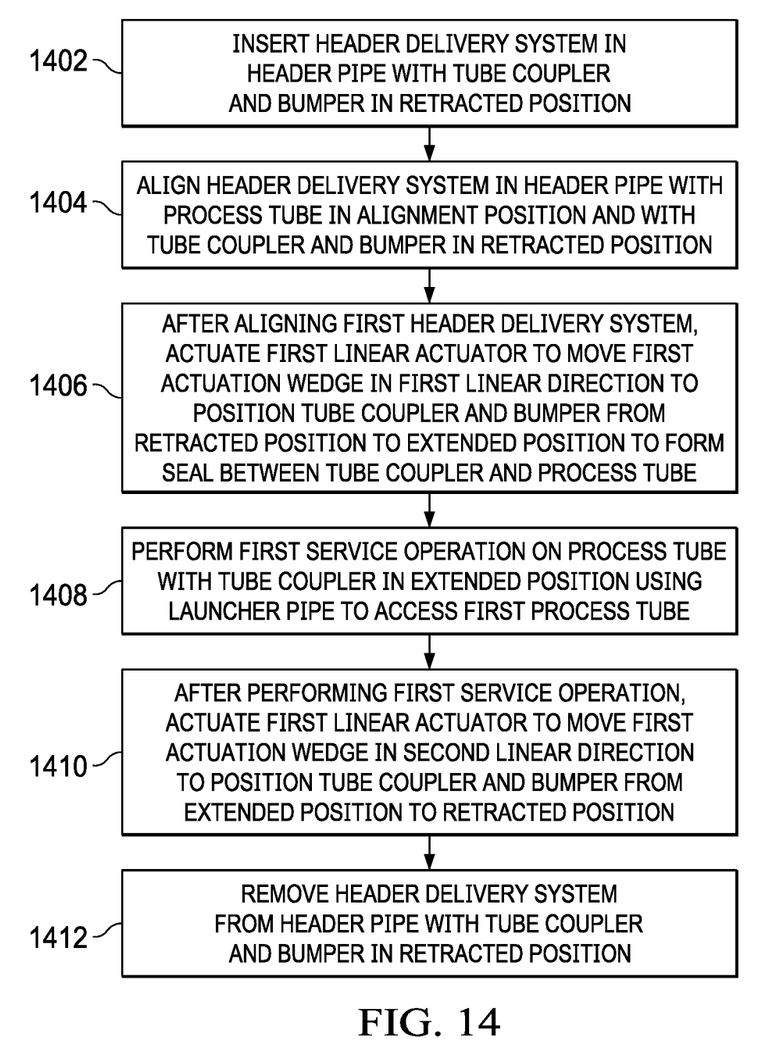
FIG. 14 is a flowchart of an operation using the header delivery system according to embodiments of the present disclosure.

After performing the first service operation, the first linear actuator may be actuated to move the first actuation wedge in a second linear direction to position the tube coupler and the bumper from the extended position to the retracted position [block 1410]. The header delivery system may be removed from the header pipe with the tube coupler and the bumper in a retracted position [block 1412].

The header delivery system of the present disclosure is designed with system components that allow the header delivery system to be sized to be fit in headers pipes of limited size. Linear actuators and the wedge assembly and other components are configured to enable the header delivery system to be built and used for limited-sized header pipes.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A header delivery system for a header pipe having a process tube extending from the header pipe, comprising:
 a launcher pipe having a first pipe end forming a first pipe opening and a second pipe end forming a second pipe opening;
 a frame assembly connected to the launcher pipe;
 a tube coupler connected to the launcher pipe at the second pipe end;
 a bumper connected to the launcher pipe; and
 a jack apparatus comprising:
  a tube coupler mount connected to the launcher pipe at the second pipe end and connected to the tube coupler,
  a wedge assembly connected to the launcher pipe and having a first actuating wedge and a first extension wedge disposed adjacent one another in a wedge configuration, and
  a linear actuator assembly having a first linear actuator connected to the first actuating wedge and configured to move the first actuation wedge in a first linear direction and to move the first extension wedge and the tube coupler mount apart from one another in response to the movement of the first actuation wedge in the first linear direction, and wherein the tube coupler and the bumper move from a retracted position to an extended position as the first extension wedge and the tube coupler mount move apart from one another.

2. The header delivery system of claim 1, wherein the first linear actuator is configured to move the first actuation wedge in a second linear direction and to move the first extension wedge and the tube coupler mount towards one another in response to the movement of the first actuation wedge in the second linear direction, and wherein the tube coupler and the bumper move from the extended position to the retracted position as the first extension wedge and the tube coupler mount move toward one another.

3. The header delivery system of claim 1, wherein the first actuating wedge is disposed between the tube coupler mount and the first extension wedge as the tube coupler and the bumper move between the retracted position and the extended position.

4. The header delivery system of claim 1, wherein the first extension wedge is connected to the bumper, and wherein the first extension wedge is configured to move radially with respect to a first axis extending through the first pipe opening of the launcher pipe as the tube coupler and the bumper are positioned between the retracted position and the extended position.

5. The header delivery system of claim 4, wherein the wedge assembly further includes a first linkage member having a first pivot connection to the first extension wedge and a second pivot connection to the frame assembly and configured to pivot at the first pivot connection and the second pivot connection to move the tube coupler mount and the first extension wedge radially apart as the tube coupler and the bumper are positioned from the retracted position to the extended position.

6. The header delivery system of claim 5, wherein the wedge assembly is configured to pivot at the first pivot connection and the second pivot connection to move the tube coupler mount and the first extension wedge radially together as the tube coupler and the bumper are positioned from the extended position to the retracted position.

7. The header delivery system of claim 1, wherein the first actuation wedge has a first tapered surface and the first extension wedge has a second tapered surface disposed opposite the first tapered surface, and wherein the first tapered surface and the second tapered surface have the same taper angle.

8. The header delivery system of claim 1, wherein the first linear actuator has a cylinder mounted on the frame assembly and a piston, wherein the first actuating wedge has a tapered end and a non-tapered end, wherein the tapered end is connected to the piston, and wherein the tapered end slides between the tube coupler mount and the extension wedge as the tube coupler and the bumper are positioned between the retracted position and the extension position.

9. The header delivery system of claim 8, wherein at least a portion of the tapered end axially spaced from the second pipe opening of the launcher pipe when the tube coupler and the bumper are in the extended position.

10. The header delivery system of claim 1, further comprising a wheel apparatus having a wheel axially spaced from the second end of the launcher pipe.

11. The header delivery system of claim 9, further comprising a wheel apparatus having a wheel axially spaced from the second end of the launcher pipe and radially contained between the tube coupler and the bumper in the retracted position.

12. The header delivery system of claim 1, wherein the first linear actuator is mounted to the frame assembly in parallel to the first axis.

13. The header delivery system of claim 1, wherein the linear actuator assembly further includes a second linear actuator spaced from the first linear actuator, wherein the wedge assembly further includes a second actuating wedge and a second extension wedge, and wherein the second linear actuator is connected to the second actuating wedge and configured to move the second actuation wedge in the first linear direction and to move the second extension wedge and the tube coupler mount apart from one another in response to the movement of the second actuation wedge in the first linear direction.

14. A method of accessing a process tube extending from a header pipe, using a header delivery system, the header delivery system including:
  a launcher pipe having a first pipe end forming a first pipe opening and a second pipe end forming a second pipe opening;
  a frame assembly connected to the launcher pipe;
  a tube coupler connected to the launcher pipe at the second pipe end;
  a bumper connected to the launcher pipe; and
  a jack apparatus comprising:
    a tube coupler mount connected to the launcher pipe at the second pipe end and connected to the tube coupler,
    a wedge assembly connected to the launcher pipe and having a first actuating wedge and a first extension wedge disposed adjacent one another in a wedge configuration, and
    a linear actuator assembly having a first linear actuator connected to the first actuating wedge and configured to move the first actuation wedge in a first linear direction and to move the first extension wedge and the tube coupler mount apart from one another in response to the movement of the first actuation wedge in the first linear direction, and wherein the tube coupler and the bumper move from a retracted position to an extended position as the first extension wedge and the tube coupler mount move apart from one another; and
  the method comprising:
    inserting the header delivery system in the header pipe with the tube coupler in a retracted position;
    aligning the header delivery system in the header pipe with the process tube in an alignment position and with the tube coupler and the bumper in a retracted position; and
    after aligning the header delivery system, actuating the first linear actuator to move the first actuation wedge in the first linear direction to position the tube coupler and the bumper from the retracted position to an extended position to form a seal between the tube coupler and the process tube; and
    performing a first service operation on the process tube with the tube coupler and the bumper in the extended position using the launcher pipe to access the process tube.

15. The method of claim 14, wherein the first linear actuator is configured to move the first actuation wedge in a second linear direction and to move the first extension wedge and the tube coupler mount towards one another in response to the movement of the first actuation wedge in the second linear direction, and wherein the tube coupler and the bumper move from the extended position to the retracted position as the first extension wedge and the tube coupler mount move toward one another; and further comprising:
  after performing the first service operation, actuating the first linear actuator to move the first actuation wedge in a second linear direction to position the tube coupler and the bumper from the extended position to the retracted position; and removing the header delivery system from the header pipe with the tube coupler and the bumper in a retracted position.

16. A header delivery system for a header pipe having a process tube extending from the header pipe, comprising:
 a launcher pipe;
 a tube coupler connected to the launcher pipe at the second pipe end;
 a bumper connected to the launcher pipe; and
 a jack apparatus comprising:
  a tube coupler mount connected to the launcher pipe at the second pipe end and connected to the tube coupler,
  a wedge assembly connected to the launcher pipe and having a first actuating wedge and a first extension wedge disposed adjacent one another in a first wedge configuration and a second actuating wedge and a second extension wedge disposed adjacent one another in a second wedge configuration,
  a linear actuator assembly having a first linear actuator connected to the first actuating wedge and a second linear actuator connected to the second actuating wedge, and the linear actuator assembly configured to move the first actuation wedge and the second actuator wedge in a first linear direction and to move the first extension wedge and the second extension wedge apart from the tube coupler mount in response to the movement of the first actuation wedge and the second actuation wedge in the first linear direction, and wherein the tube coupler and the bumper move from a retracted position to an extended position as the first extension wedge and the tube coupler mount move apart from one another.

17. The header delivery system of claim 16, wherein the linear actuator assembly is configured to move the first actuation wedge and the second actuation wedge in a second linear direction and to move the first extension wedge and the second extension wedge towards the tube coupler mount in response to the movement of the first actuation wedge and the second actuation wedge in the second linear direction, and wherein the tube coupler and the bumper move from the extended position to the retracted position as the first extension wedge and the second extension wedge move toward the tube coupler mount.

18. The header delivery system of claim 17, wherein the first actuating wedge is disposed between the tube coupler mount and the first extension wedge and the second actuating wedge is disposed between the tube coupler mount and the second extension wedge as the tube coupler and the bumper move between the retracted position and the extended position.

19. The header delivery system of claim 16, wherein the first extension wedge and the second extension wedge are connected to the bumper, and wherein the first extension wedge and the second extension wedge are configured to move radially with respect to a first axis extending through the first pipe opening of the launcher pipe as the tube coupler and the bumper are positioned between the retracted position and the extended position.

20. The header delivery system of claim 19, wherein the wedge assembly further includes:
 a first linkage member having a first pivot connection to the first extension wedge and a second pivot connection to the frame assembly and configured to pivot at the first pivot connection and the second pivot connection to move the tube coupler mount and the first extension wedge radially apart as the tube coupler and the bumper are positioned between the retracted position and the extended position; and
 a second linkage member having a third pivot connection to the second extension wedge and a fourth pivot connection to the frame assembly and configured to pivot at the third pivot connection and the fourth pivot connection to move the tube coupler mount and the second extension wedge radially apart as the tube coupler and the bumper are positioned between the retracted position and the extended position.

* * * * *